Aug. 14, 1956 — H. W. CHILDRESS — 2,758,406
FISH HOOK AND PLUG DE-SNAGGER
Filed July 16, 1954
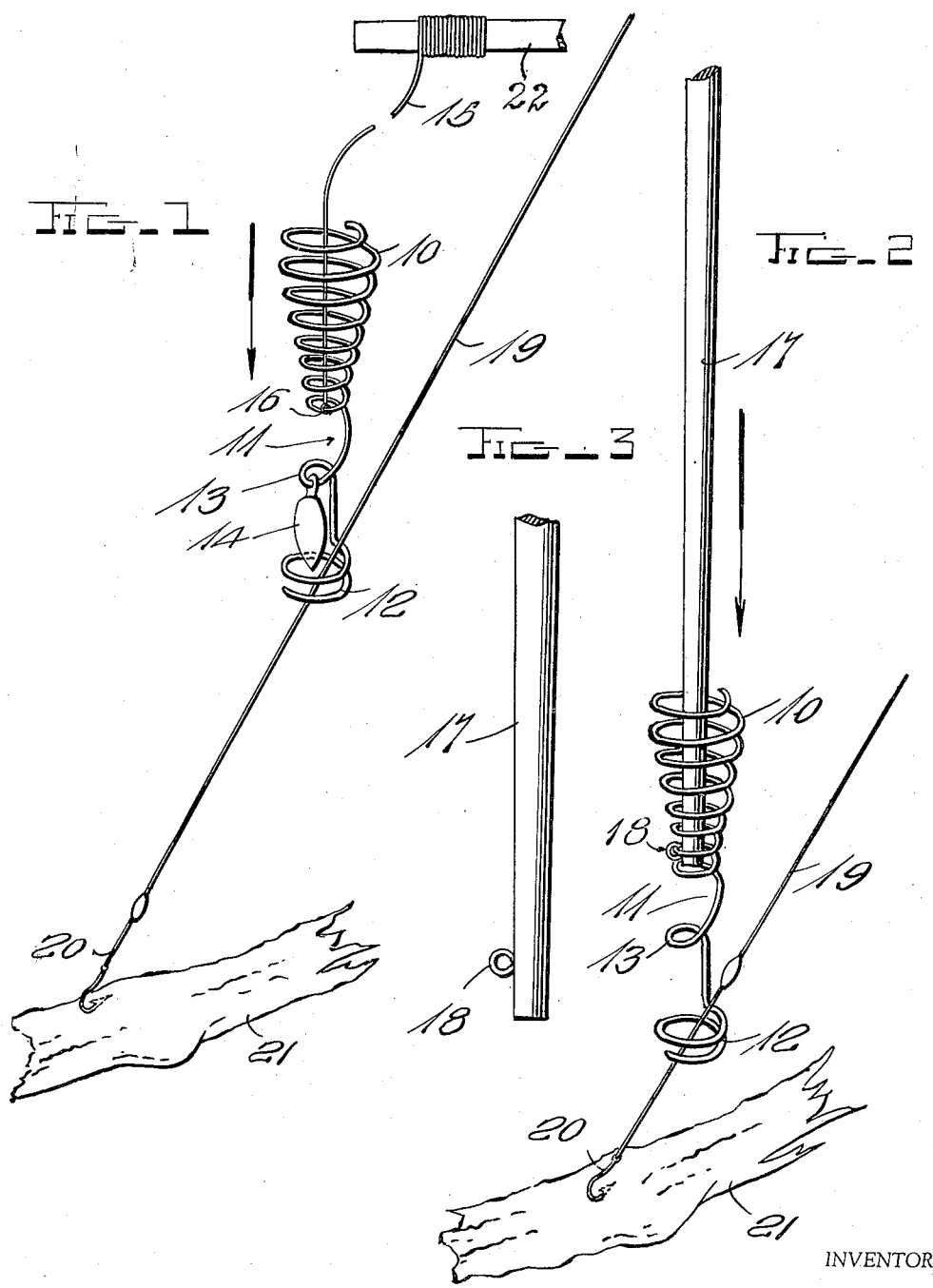
INVENTOR,
HUNTER W. CHILDRESS,
BY
E. E. Vrooman & Co.,
ATTORNEYS.

United States Patent Office 2,758,406
Patented Aug. 14, 1956

2,758,406

FISH HOOK AND PLUG DE-SNAGGER

Hunter W. Childress, Richmond, Va.

Application July 16, 1954, Serial No. 443,857

1 Claim. (Cl. 43—17.2)

This invention consists of a device for freeing the fish hooks of fishing lines from snags caught under water and is preferably termed a hook de-snagger.

One important object of the invention is to provide novel means whereby a hook caught in a root or other obstruction may be freed therefrom.

A second important object of the invention is to provide a device of this sort which may be operated either from a rod or a supplemental line.

A third important object of the invention is to provide a means of this character which may be utilized at any time after a hook has been snagged to relieve the hook from the snagged object.

A fourth important object of the invention is to provide a device of this character which is cheap in construction, made of spring wire and will operate effectively to remove a hook from an object on which the hook is snagged.

With the above and other objects in view, the invention consists in general of certain novel details of construction and combinations of parts hereinafter fully described, illustrated in the accompanying drawings, and particularly claimed.

In the accompanying drawings, like characters of reference indicate like parts, and:

Fig. 1 is a perspective view of the preferred form of the invention.

Fig. 2 is a view similar to Fig. 1, but showing the invention as utilized with a rigid staff or pole.

Fig. 3 is an enlarged detailed view of the end of rigid staff or pole to be used with the device as shown in Fig. 2.

This de-snagger consists principally of a single length inverted conical spiral 10 of spring wire. The final small convolution of the conical spiral 10 extends downwardly a considerable distance as at 11 and terminates in a pair of spaced coils 12, the extension 11 being provided intermediate its upper and lower ends with a loop 13. This loop 13 is adapted to support a weight 14. In the form shown in Fig. 1 there is illustrated a coil of cord 15, wound around a spool or spindle 22, which cord 15 extends downwardly through the conical spiral 10 and is connected as at 16 with the lower convolution. This cord 15 thus supports the conical spiral 10.

The form shown in Fig. 2 comprises the rigid staff or pole 17 which carries a screw eye 18 forming a peg or guide for means of fastening to the de-snagger, thus forming a rigid handle for utilization as in Fig. 2 to push the de-snagger down the line to free the hook. It will thus be seen that I have provided means, 15 or 17, for operating the de-snagger. Further, it is to be noted that the convolutions of 10, 13 and 12 are normally disposed at right angle to the vertical axis of the staff.

Therefore, it will be seen that the longitudinal axis of said spiral coils is substantially coincident with the axis of the conical formation and with the vertical axis of the sinker which is adapted to be attached to the loop of the extension.

By aligning the rigid staff or pole with the coil 10 and engaging the screw eye 18 with the top coil of the member 10, rotate the pole until it becomes confined within a substantial portion of the cone shaped spring 10. Then, at water level on the fishing line 19 pass the fishing line 19 into the center of coil 12 by rotating the line 19 between the coils. Then push down on the rigid staff or pole 17 until spring 12 engages the hook at the bottom of the line, and finally push it backwards out of the snag.

In the form shown in Fig. 1, the weight 14 is used when the de-snagger is not being used with a staff or rigid pole. The weight 14 carries the de-snagger down the fishing line 19, whereby the hook may be de-snagged and retrieved by line 15. The spool 22 that line 15 is wound on in Fig. 1 has no connection whatever with the rod or staff 17 in Fig. 2, but is used merely to wrap the line 15 on for easier handling.

In a device of the kind described, I claim:

A fish hook releaser comprising a single length of resilient wire having a conical spiral formation at one end adapted to receive centrally thereof a fishing implement in substantially free spaced relation from the sides thereof, said implement adapted to be secured at one end thereof to the smallest loop of the spiral, the smallest loop of the spiral having a longitudinal extension substantially parallel to the longitudinal axis of the spiral and having a loop intermediate the ends thereof adapted to receive a sinker freely suspended therefrom, and a pair of spiral coils at the end of the extension adapted to receive a fishing line therethrough, the longitudinal axis of said spiral coils being substantially coincident with the axis of the conical formation and normally disposed coincident with the vertical axis of the sinker which is adapted to be attached to the loop of the extension.

References Cited in the file of this patent

UNITED STATES PATENTS

| | | |
|---|---|---|
| 1,980,302 | Taylor | Nov. 13, 1934 |
| 2,316,500 | Bray | Apr. 13, 1943 |
| 2,344,838 | Van Sickle | Mar. 21, 1944 |
| 2,397,916 | Bray | Apr. 9, 1946 |
| 2,472,207 | Gundel | June 7, 1949 |
| 2,553,173 | Consolo et al. | May 15, 1951 |
| 2,697,894 | Graham et al. | Dec. 28, 1954 |